Figure 6:
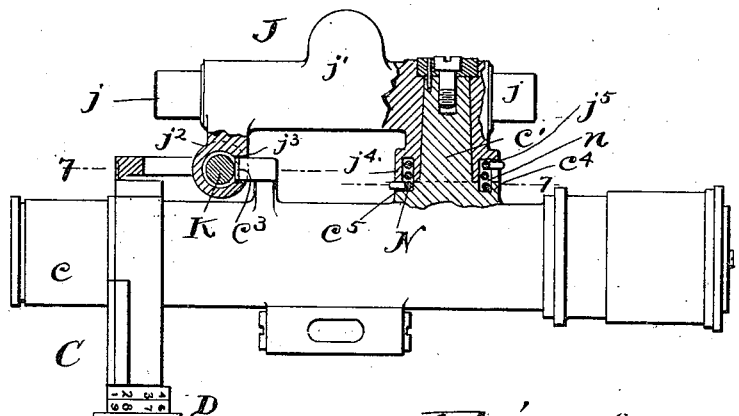

No. 677,288. Patented June 25, 1901.
A. SWASEY.
TELESCOPIC GUN SIGHT.
(Application filed July 10, 1899.)
(No Model.) 2 Sheets—Sheet 1.
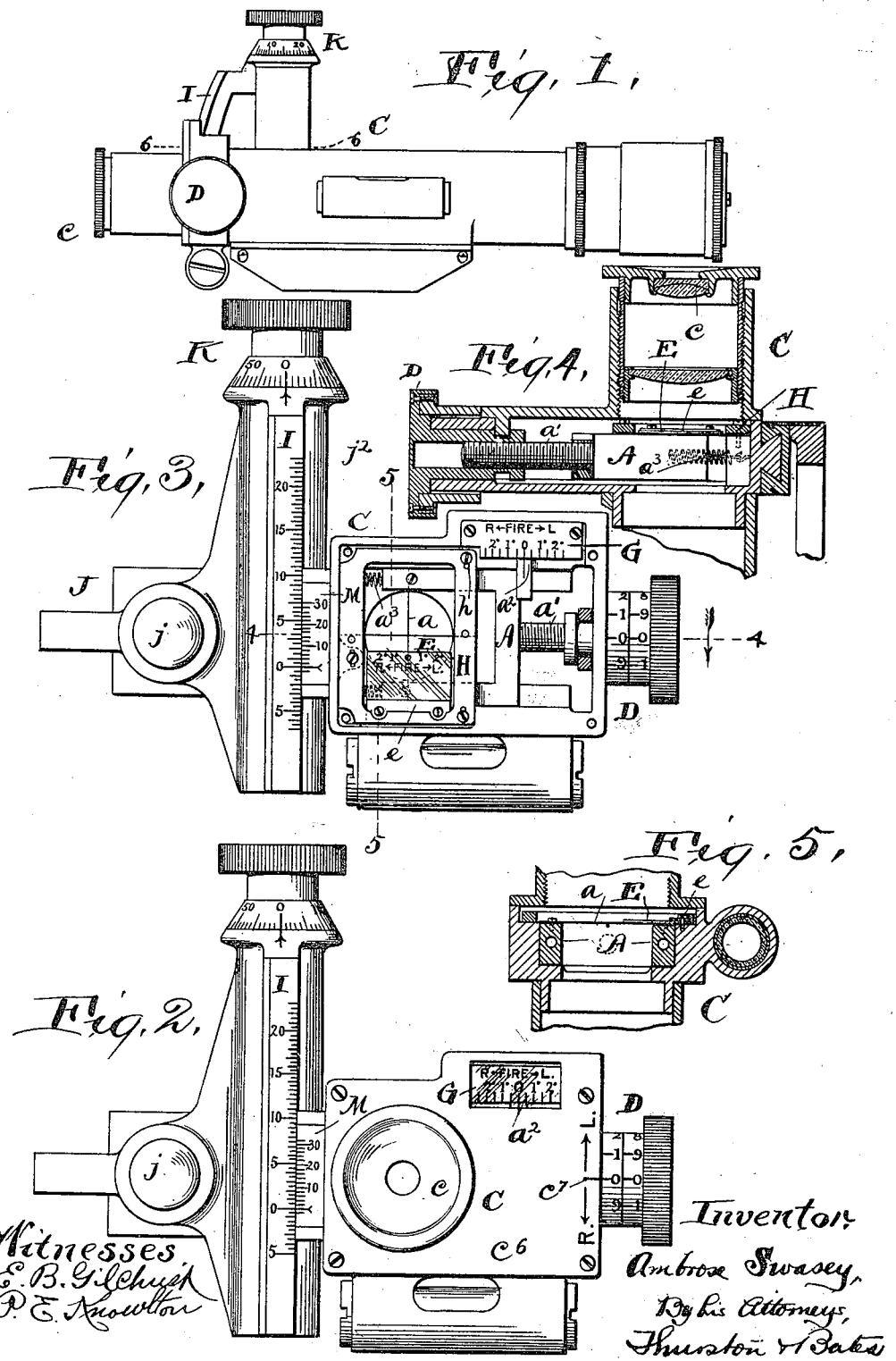
Witnesses
E. B. Gilchrist
P. E. Knowlton
Inventor
Ambrose Swasey,
By his Attorneys,
Thurston & Bates No. 677,288. Patented June 25, 1901.
A. SWASEY.
TELESCOPIC GUN SIGHT.
(Application filed July 10, 1899.)
(No Model.) 2 Sheets—Sheet 2.

Witnesses.
E. B. Gilchrist
Philip E. Knowlton

Inventor.
Ambrose Swasey,
By his Attorneys,
Thurston & Bates

UNITED STATES PATENT OFFICE.

AMBROSE SWASEY, OF CLEVELAND, OHIO, ASSIGNOR TO WARNER & SWASEY, OF SAME PLACE.

TELESCOPIC GUN-SIGHT.

SPECIFICATION forming part of Letters Patent No. 677,288, dated June 25, 1901.

Application filed July 10, 1899. Serial No. 723,373. (No model.)

*To all whom it may concern:*

Be it known that I, AMBROSE SWASEY, a citizen of the United States, residing at Cleveland, in the county of Cuyahoga and State of Ohio, have invented a certain new and useful Improvement in Telescopic Gun-Sights, of which the following is a full, clear, and exact description, reference being had to the accompanying drawings.

The invention is an improvement upon the well-known telescopic gun-sight.

The object of the invention is to simplify and improve the construction, whereby the instrument is rendered more efficient and durable and more easily handled and used.

The invention consists in the construction and combination of parts shown in the drawings and hereinafter described, and pointed out definitely in the claims.

Figure 7:
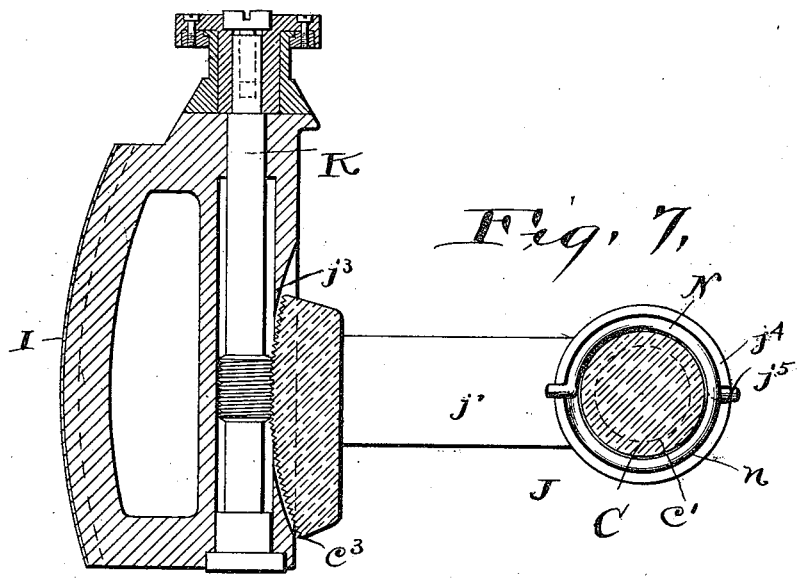

In the drawings, Figure 1 is a right side elevation of a telescopic gun-sight containing my invention. Fig. 2 is a rear end view thereof. Fig. 3 is a similar view when the eyepiece and the rear end plate of the telescope are removed. Fig. 4 is a sectional view on line 4 4 of Fig. 3 looking in the direction of the arrow. Fig. 5 is a sectional view on line 5 5 of Fig. 3. Fig. 6 is a plan view with pivot-bearing of the telescope and the housing which contains the elevation-screw in section. Fig. 7 is a sectional view on line 7 7 of Fig. 6.

The telescope C has near its objective end a horizontal cylindrical stud $c'$, which serves as a supporting-pivot, and has its bearing in a horizontal hole in the sight-frame J. This frame is located wholly upon one side of the telescope and has trunnions $j$ at its ends for engagement in the supporting-bracket attached to the gun, and it also has between said trunnions an arm $j'$, which is adapted to engage beneath the leveling-screw on the said bracket. The frame is also provided near its rear end with a vertical housing $j^2$, which embraces and furnishes a bearing for the micrometer-screw K. In the front side of this housing is a vertical slot $j^3$, through which a worm-gear segment $c^3$ on the side of the telescope projects into engagement with the said micrometer-screw. By turning the micrometer-screw in one direction or the other the telescope is turned about its pivot-stud $c'$, thereby changing the elevation of the telescope. The degree of elevation due to this movement is ascertained by means of a graduated scale I on the frame and a vernier scale M on the telescope. An annular flange $j^4$ on the frame J surrounds the inner end of the bearing for the pivot-stud, and a similar flange $c^4$ on the telescope surrounds said bearing-stud at its base. When the parts are assembled, these flanges engage and inclose a recess $n$, in which is placed a torsional coil-spring N, the outer ends of which are turned outward. One of said ends enters a notch $j^5$ in the flange $j^4$ and the other enters a notch $c^5$ in the flange $c^4$, whereby this spring acts to prevent any backlash in the actuation of the elevation mechanism.

For giving the deflection two scales are employed, one inside the telescope—that is to say, beyond the eyepiece—and the other outside the telescope—that is to say, to one side of the eyepiece—and two pointers, both secured to the same laterally-sliding frame A. The interior scale E is a horn-scale, which is fastened in the micrometer-box by means of a clamping-plate $e$. The horn-scale is shown as graduated to two degrees and thirty minutes on each side of the zero, and the smallest division thereon is three minutes. Within the micrometer-box a transversely-movable sliding frame A is mounted in suitable guides. To it is secured a pointer in the form of a vertical cross-wire $a$, which coöperates with this horn-scale to indicate the deflection. A horizontal cross-wire is secured to a frame H, which is adjustably secured in the micrometer-box. It is provided with slots $h$, through which the fastening-screws pass, whereby this frame may be adjusted so that said horizontal wire will be extended in a truly-horizontal direction across the middle of the field of vision.

Secured to the frame A is a laterally-extended pointer $a^2$, which coöperates with the outside scale G. Both pointers $a$ $a^2$, being secured to the frame A, move in unison. The deflection is shown to one looking in the telescope by the position of the vertical pointer-wire $a$ with respect to the horn-scale E. The deflection is likewise indicated without looking in the telescope by means of the scale G and the pointer $a^2$.

The eyepiece $c$ of the telescope is formed integral with the cap-plate $c^6$ of the micrometer-box, which is secured to said box by means of screws. This cap-plate is cut away adjacent to the scale G, whereby the indications of said scale may be read.

The frame A is moved in one direction or other by means of a horizontal deflection-screw $a'$, secured to the right side of the frame A, and the micrometer-nut D, which screws onto the projecting end of said screw and bears against the side of the micrometer-box. Backlash is overcome by two contractile spiral springs $a^3 a^3$, which are secured at one of their ends to the inner wall of the micrometer-box and at the other to the sliding frame A. The outside scale G is graduated to degrees and half-degrees, and the micrometer screw and nut are accurately cut, so that one complete turn of the nut moves the sliding frame thirty minutes. The three-minute readings to correspond with the graduations on the horn-scale are obtained from the micrometer-nut. This nut is graduated on its collar with, preferably, two series of figures, from "0" to "9," and running in opposite directions, which figures coöperate with a graduation-mark $c^7$ on the cap-plate of the micrometer-box. One series of figures gives the correct reading when the deflection movement is for firing to the left and the other series for the contrary movement.

Having described my invention, what I claim as new, and desire to secure by Letters Patent, is—

1. In a telescopic gun-sight, the combination of a telescope having, on one side, a laterally-projecting pivot-stud, and an annular flange surrounding the said stud at the base thereof, with a supporting-frame having a horizontal bearing for said stud, and an annular flange surrounding said bearing, said flanges having each a notch, a torsion coil-spring surrounding said stud and lying in the recess formed by said flanges and having its ends turned outward and inserted in said notches respectively, means for moving the telescope about the axis of said stud, and a scale for measuring the elevation due to such movement, substantially as specified.

2. In a telescopic gun-sight, the combination of a telescope having on one side a laterally-extending pivoting-stud located near its front end, and a worm-wheel segment located near its rear end, with a supporting-frame lying wholly on one side of said telescope and having trunnions at its ends, and having on the side which is farthest from the telescope a lateral projecting arm, and having on the side which is adjacent to the telescope, a horizontal bearing for said stud and a vertical housing in which is a vertical slot through which said worm-wheel segment projects, and a micrometer-screw which is inclosed and mounted in said housing and engaging with said worm-wheel segment, substantially as specified.

3. In a telescopic gun-sight, a deflection finder consisting of a body, a fixed frame carrying a horizontal wire, a transversely-movable frame carrying a vertical wire, a threaded stud and a pointer, springs connecting said movable frame with said body, a fixed scale coöperating with said pointer, a micrometer-nut mounted upon said stud and coöperating with said scale, substantially as specified.

4. In a telescopic gun-sight, a deflection finder consisting of a body, a fixed frame carrying a horizontal wire, a transversely-movable frame carrying a vertical wire, a threaded stud and a pointer, spiral springs carried in recesses in said movable frame connected to said body, a fixed scale coöperating with said pointer, a micrometer-nut on said stud having two scales, either of which may coöperate with said fixed scale, substantially as specified.

In testimony whereof I hereunto affix my signature in the presence of two witnesses.

AMBROSE SWASEY.

Witnesses:
WM. E. REED,
P. E. KNOWLTON.